Patented Dec. 21, 1943

2,337,256

UNITED STATES PATENT OFFICE 2,337,256

PREPARATION OF AZOBENZENE SULPHONATE

Harry F. Lewis and Irwin A. Pearl, Appleton, Wis., assignors to The Institute of Paper Chemistry, Appleton, Wis., a corporation of Wisconsin No Drawing. Application February 12, 1942, Serial No. 430,620

5 Claims. (Cl. 260—205)

The present invention relates to the preparation of azobenzene sulphonate and the like and of materials therefrom of importance in the dyestuff industry. The present invention is directed in particular to the preparation of the sodium salt of p-azobenzene sulphonic acid by reaction of nitrobenzene with alkaline sulphite waste liquor and the preparation therefrom of benzidine.

Heretofore processes have been proposed for the manufacture of vanillin from lignin in which nitrobenzene is reacted with an aqueous sulphite waste liquor containing caustic alkali. In these prior processes, such as described in Schulz U. S. Patent No. 2,187,366, high temperatures with superatmospheric pressures are employed and the resulting products are vanillin and azobenzene.

We have discovered that the reaction between nitrobenzene and alkaline sulphite waste liquor may be carried out to produce as a principal product p-azobenzene sulphonic acid in the form of its sodium salt. This product is of particular value as it may be advantageously converted as described hereinafter to a benzidine product of great importance in the dyestuff industry.

The following example of one of the preferred procedures will serve to illustrate the present invention.

A mixture of about 450 parts aqueous sulphite waste liquor (containing about 43.7 per cent or 200 parts solids of which about 86 parts are lignin), 125 parts sodium hydroxide, and 100 parts nitrobenzene is heated to boiling at atmospheric pressure under reflux with stirring for about 10 hours. The reaction mixture may then be steam distilled to remove aniline, some azoxybenzene and any unchanged nitrobenzene. Benzene extraction of the alkaline reaction mixture may be employed to recover azoxybenzene. The precipitate of golden platelets of p-sodium azobenzene sulphonate remaining in the reaction mixture may be separated by filtering or centrifuging and washed with sodium hydroxide solution. There is no azobenzene formed in the above process, the described benzene derivatives recovered accounting for about 99% of the nitrobenzene used in the process.

It will be understood that the present invention is not limited to the above example. Satisfactory results have been obtained, for example, by using one part of sulphite waste liquor solids to 0.43–1.3 parts of nitrobenzene, 0.28–0.82 part of sodium hydroxide and 1.2–6.4 parts of water. The optimum conditions for producing high yields of the desired azobenzene sulphonate with the particular sulphite waste liquor employed may be readily obtained by preliminary test.

The temperatures as well as pressures used may also be varied over a wide range. Satisfactory results, for example, are obtained at temperatures of 102° C. to 130° C.—the processes using the higher temperatures being carried out in an autoclave under pressure. The times of the reaction may also vary depending on proportion of ingredients, conditions of reaction, etc. from a few minutes to 27 hours. Ordinarily, the use of boiling temperatures at atmospheric pressure are preferred as such conditions produce the highest yields of the desired product. In this connection it is interesting to note that at 160° C. no azoxybenzene is obtained and the yield, if any, of the desired azobenzene sulphonate is very small.

Alternative procedures for separation of the desired products may be employed as desired. For example, the cold reaction mixture may be extracted directly with benzene, whereupon aniline, nitrobenzene, and all of the azoxybenzene will go into solution, leaving the sodium salt of p-azobenzene sulphonate to be removed by filtration. Another procedure is to take the cold alkaline solution following steam distillation in the preferred procedure and filter in order to remove the azoxybenzene and sodium p-azobenzene sulphonate, whereupon 90–95% of the azoxybenzene is removed, along with the sodium p-azobenzene sulphonate. These two may be separated by extraction of the azoxybenzene with benzene.

Other reaction products may also be recovered if desired. For example, vanillin may be recovered from the filtrate or clear solution of the above preferred procedure by acidifying with carbon dioxide and benzene extraction. The vanillic acid in such case may be recovered by benzene extraction after further acidification with sulphuric acid. An alternative procedure here is to acidify the aqueous solution remaining after the sodium p-azobenzene sulphonate is recovered by filtering in the preferred procedure, directly with hydrochloric acid or sulphuric acid, followed by extraction with benzene, whereupon the crude vanillin and vanillic acid will be extracted together. The vanillic acid may be taken out of this mixture by extraction of the benzene solution with dilute sodium bicarbonate, or the vanillin may be separated from the vanillic acid by distillation under reduced pressure. Modifications of the described illustrative procedures may also be employed.

The conversion of the p-sodium azobenzene sulphonate of the present invention to benzidine, involves reduction of the azo radical —N=N— to the hydrazo radical —NH—NH— by use of hydrogen sulphide, sodium hydrosulphite, etc. followed by addition of sufficient acid such as HCl to acidify the alkaline mixture. Shortly after the hydrazo mixture has been made acid, benzidine sulphate precipitates as a white solid. The following example is illustrative.

A mixture of about 30 parts of sodium p-azobenzene sulphonate, 4 parts of sodium hydroxide, and 3000 parts of water is heated to boiling and hydrogen sulphide gas is introduced until the mixture becomes colorless. Boiling is continued several minutes and the solution is then cooled. Upon acidification with hydrochloric acid the desired benzidine sulphate precipitates.

The azoxybenzene may be reduced by standard procedures in a similar manner by alkaline reduction to hydrazobenzene. This product on warming with acids forms benzidine and in the presence of sulphuric acid precipitates as the desired benzidine sulphate.

The reduction may be carried out by the use of metals, or metal compositions such as zinc, $FeSO_4$, etc. although the present process is particularly advantageous as it provides improved means for the preparation of benzidine from nitrobenzene without metallic reduction. In this connection it is interesting to note in prior benzidine processes that it requires about 160 pounds of zinc dust to reduce 100 pounds of nitrobenzene and that the yield of benzidine obtained is only about 60 pounds. Using applicants' process with about 200 pounds of waste sulphite liquor solids and 100 pounds of nitrobenzene a total yield of approximately 75 pounds of benzidine may be obtained.

The reactions taking place in the process of the present invention are not fully understood at present. Investigations indicate that either or both the inorganic sulphites and lignin sulphonic acids, sulphonates azoxybenzene or azobenzene to form the p-azobenzene sulphonate. The lignin sulphonic acids and/or in combination with the carbohydrate material also probably effects the desired reduction. The present invention, however, is not limited by theoretical explanations.

In our benzidine process we have found that the use of high temperatures (e. g. above 150° C.) are not satisfactory, particularly when using relatively small proportions of waste liquor. For producing the azobenzene sulphonate of the present invention temperatures around 102°–105° C. at atmospheric pressure or 110°–115° C. with pressure are preferred. The optimum temperatures with various proportions of ingredients in the preparation of the desired reduction products may be obtained by preliminary test.

It will be understood that the present invention is not limited to the above illustrative example. In place of sodium hydroxide other strong alkalies such as the alkali metal hydroxides may be used as desired. All modifications of the present invention are intended to be covered by the following claims.

We claim:

1. The process of preparing an alkaline salt of p-azobenzene sulphonic acid which comprises mixing nitrobenzene with aqueous alkaline sulphite waste liquor and heating this mixture to the boiling temperature to reduce the nitro compound and sulphonate one of the benzene rings of the resulting azo compound.

2. The process of preparing the sodium salt of p-azobenzene sulphonic acid which comprises mixing nitrobenzene with caustic soda and with sulphite waste liquor, and heating the resulting mixture to boiling at atmospheric pressure to reduce the nitro compound and sulphonate one of the benzene rings of the resulting azo compound.

3. The process of preparing p-azobenzene sulphonate adaptable for use in the preparation of benzidine which comprises mixing nitrobenzene with aqueous alkaline sulphite waste liquor, and heating the resulting mixture to a temperature of about 102°–130° C. to reduce the nitro compound and sulphonate one of the benzene rings of the resulting azo compound.

4. The process of preparing p-azobenzene sulphonate adaptable for use in the preparation of benzidine, which comprises mixing nitrobenzene with aqueous sulphite waste liquor and with caustic alkali, and heating the resulting mixture to a temperature of about 102°–105° C. to reduce the nitro compound and sulphonate one of the benzene rings of the resulting azo compound.

5. The process of preparing the sodium salt of p-azobenzene sulphonic acid which comprises mixing about 100 parts of nitrobenzene and about 125 parts of caustic soda with aqueous sulphite waste liquor containing about 200 parts of solids, and heating the resulting mixture to a temperature of about 102°–105° C. to reduce the nitro compound and sulphonate one of the benzene rings of the resulting azo compound.

HARRY F. LEWIS.
IRWIN A. PEARL.